United States Patent
Beri et al.

(10) Patent No.: US 11,295,499 B1
(45) Date of Patent: Apr. 5, 2022

(54) GENERATING NESTED REPETITIONS FOR DISPLAY USING MULTIPLE RENDERING TECHNIQUES

(71) Applicant: Adobe Inc., San Jose, CA (US)

(72) Inventors: Tarun Beri, Noida (IN); Gaurav Jain, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/108,968

(22) Filed: Dec. 1, 2020

(51) Int. Cl.
| | |
|---|---|
| *G06T 11/60* | (2006.01) |
| *G06T 1/60* | (2006.01) |
| *G06T 11/00* | (2006.01) |
| *G06T 3/00* | (2006.01) |

(52) U.S. Cl.
CPC ............... *G06T 11/60* (2013.01); *G06T 1/60* (2013.01); *G06T 3/0006* (2013.01); *G06T 11/001* (2013.01)

(58) Field of Classification Search
CPC ....... G06T 3/4038; G06T 1/20; G06T 3/0006; G06T 3/4084; G06T 11/001; G06T 11/40; G06T 2210/12; G06T 5/002; G06T 5/50; G06T 17/00; G06T 7/285; H04W 72/0446; H04W 72/0453; G06N 20/00; G06F 2009/45595; G06F 16/27
See application file for complete search history.

(56) References Cited

U.S. PATENT DOCUMENTS

| | | | |
|---|---|---|---|
| 8,514,238 B2 * | 8/2013 | Winnemoeller | G06T 17/20 345/582 |
| 10,380,769 B1 | 8/2019 | Beri et al. | |
| 2005/0228353 A1 * | 10/2005 | Thomas | A61F 13/537 604/385.01 |
| 2007/0291050 A1 * | 12/2007 | Bruderlin | G06T 13/40 345/606 |
| 2021/0312590 A1 | 10/2021 | Beri et al. | |

OTHER PUBLICATIONS

"First Action Interview Office Action", U.S. Appl. No. 16/838,864, dated Apr. 13, 2021, 9 pages.
"Pre-Interview First Office Action", U.S. Appl. No. 16/838,864, dated Feb. 25, 2021, 65 pages.
"U.S. Appl. No. 16/838,864", filed Apr. 2, 2020.
"Final Office Action", U.S. Appl. No. 16/838,864, filed Sep. 21, 2021, 21 pages.

* cited by examiner

*Primary Examiner* — Xilin Guo
(74) *Attorney, Agent, or Firm* — FIG. 1 Patents

(57) ABSTRACT

A switchable rendering system uses both instanced rendering and vector rendering in rendering a raster or vector graphic with a nested repetition. The nested repetition includes multiple levels of repetition and for each level the switchable rendering system selects instanced rendering or vector rendering to render the level. This selection is based on resource availability, such as using instanced rendering for a level when the current resource availability is sufficient to allow instanced rendering for the level, and using vector rendering for a level when the current resource availability is not sufficient to allow instanced rendering for the level.

20 Claims, 8 Drawing Sheets

GENERATING NESTED REPETITIONS FOR DISPLAY USING MULTIPLE RENDERING TECHNIQUES

BACKGROUND

As computer technology has advanced, a wide variety of applications providing various different features have become available, such as content creation applications. Content creation applications provide various different features allowing users to create content from scratch, edit previously created content, and so forth. The range of creation and editing features these content creation applications provide is quite broad, giving users a powerful application to generate a variety of different content.

One feature that some content creation applications provide is a repeat feature that allows users to select a graphic and repeat it in various different patterns. This feature is very useful, allowing users to quickly and easily generate raster and vector graphics with repeated intricate designs. However, problems exist with generating such repeated patterns. One such problem is that depending on the manner in which the feature is implemented, repeating the graphic many times (such as on the order of hundreds of thousands or millions of times) is oftentimes time consuming and requires a significant amount of memory, leading to performance problems with the content creation application such as user noticeable delays in rendering time for the repeated pattern and out of memory errors. These performance problems oftentimes leave users frustrated and dissatisfied with their devices.

SUMMARY

To mitigate the problems of conventional content creation applications, a switchable rendering system as implemented by a computing device is described to provide generating nested repetitions for display using multiple rendering techniques. The switchable rendering system receives a base art to repeat in a nested repetition including multiple hierarchical levels of repetitions. The switchable rendering system performs the following for each of the multiple hierarchical levels. A pattern to apply to produce a repetition for the level is received and a current resource availability in the computing device is identified. A determination is made as to whether the current resource availability is sufficient to allow instanced rendering for the level. In response to determining that the current resource availability is sufficient to allow instanced rendering for the level, instanced rendering is performed to generate the repetition for the level in a buffer by generating an affine transformation matrix corresponding to the pattern and applying the transformation matrix to the base art. In response to determining that the current resource availability is not sufficient to allow instanced rendering for the level, vector rendering is performed to generate the repetition for the level in the buffer by copying the base art. The data in the buffer is displayed as the nested repetition of the base art.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
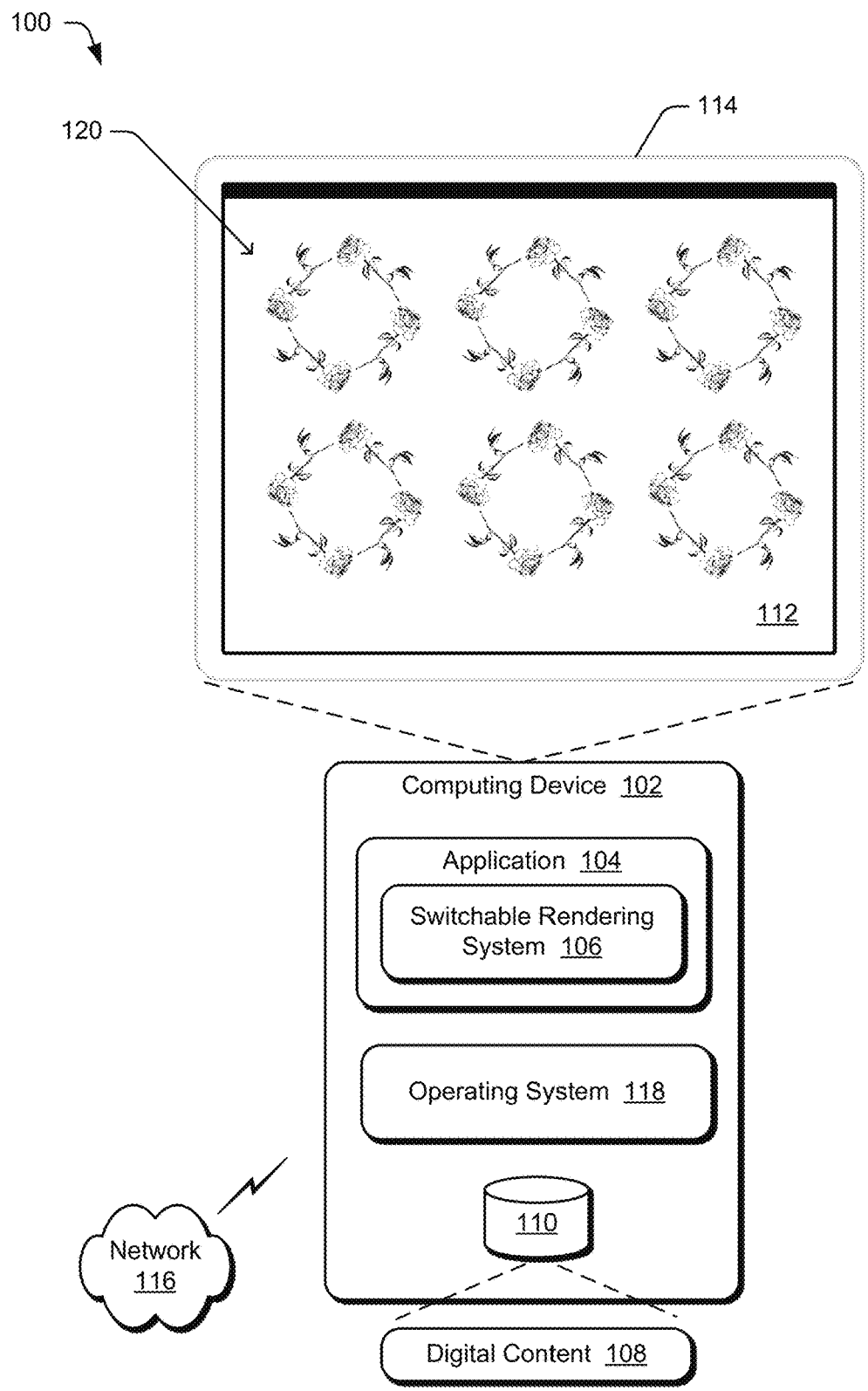
FIG. 1 is an illustration of a digital medium environment in an example implementation that is operable to employ the generating nested repetitions for display using multiple rendering techniques described herein.

Generating nested repetitions for display using multiple rendering techniques is discussed herein. Generally, a switchable rendering system uses both instanced rendering and vector rendering in rendering a raster or vector graphic with a nested repetition. The nested repetition includes multiple levels of repetition and for each level the switchable rendering system selects instanced rendering or vector rendering to render the level to an offscreen buffer. This selection is based on resource availability, such as using instanced rendering for a level when the current resource availability is sufficient to allow instanced rendering for the level and using vector rendering for a level when the current resource availability is not sufficient to allow instanced rendering for the level. After all of the levels in the nested repetition are rendered to the offscreen buffer, the data in the offscreen buffer is provided to a display device for display.

Vector rendering and instanced rendering are performed in different manners and have different tradeoffs. Situations arise in which vector rendering has performance issues, such as being slow (e.g., delays in displaying the raster or vector graphic are noticeable to the user, such as when zooming in or out on the raster or vector graphic, adding a new level of repetition, and so forth). This slowness is a result of the base art being rendered many times, oftentimes on the order of hundreds of thousands or millions of copies of the base art being rendered. However, in such situations vector rendering is also more memory efficient because the size of the base art being rendered is small.

On the other hand, instanced rendering allows for faster rendering because the art being repeated (which is possibly art that is the result from rendering a previous level) need not be copied as many times as in vector rendering. As discussed in more detail below, instanced rendering refers to generating one or more affine transformation matrices indicating how a base art is to be repeated and applying those matrices to the base art to create a repetition of the base art. However, situations arise in which instanced rendering has performance issues, such as exceeding resource availability (e.g., memory, available textures, texture dimension). Resource availability is exceeded for example as a result of the size of the art obtained from rendering a previous level being large (e.g., in order to provide a raster or vector graphic of the desired dimension and resolution allowing users to zoom in or out by large amounts, such as thousands of percent). Exceeding resource availability poses various problems, such as crashing the content creation application, causing a restart of the computing device, causing the raster or vector graphic to be displayed incorrectly, and so forth.

By switching between instanced rendering and vector rendering, the switchable rendering system takes advantage of the benefits of each type of rendering. Thus, the speed of rendering using instanced rendering is obtained in rendering levels where current resource availability allows instanced rendering, and the memory efficiency of vector rendering is obtained in rendering levels where current resource availability does not allow instanced rendering.

More specifically, the switchable rendering system on a computing device generates nested repetitions for display using a combination of vector rendering and instanced rendering. The switchable rendering system receives commands describing a nested repetition to be generated, such as commands indicating user inputs identifying a base art for the nested repetition, one or more patterns to use for the nested repetitions (e.g., a pattern for each of the multiple hierarchical levels of the nested repetition), and the number of hierarchical levels to include in the nested repetition. The base art takes any of various forms and is typically a vector rendering including various vector paths.

The vector rendering uses vector graphics or vector rendering, which renders data to an offscreen buffer based on mathematical formulas that establish points on a grid and connect those points with lines and curves (vector paths) to form various geometric shapes such as polygons. The vector paths have various properties such as colors, shapes, fills, thicknesses, and so forth. The vector rendering also renders graphics (e.g., raster graphics), such as based on cached data from the offscreen buffer.

The instanced rendering builds affine transformation matrices to be applied to the base art based on the indicated pattern. The instanced rendering forms matrices of desired base art graphics replications that are all applied to a single instance of the base art. A transformation to a base art is processed to generate one or more affine transformation matrices for repetitions from parsed operations. For example, an affine transformation matrix is generated for each transformation resulting in a repetition. For each transformation, the affine transformation matrix encapsulates the operations performed on a base art to create the repetition. Each affine transformation matrix is applied to the base art to create a repetition.

The affine transformation matrix is employed to generate repetitions in any of a variety of patterns. For a given transformation, operations and operation configuration data, which are values relevant to each operation, are identified. Based on the type of operation, the coefficients that reside in particular positions within the affine transformation matrix are generated. The affine transformation matrix is multiplied with the coordinates of base art to generate a repetition.

To make the selection of instanced rendering or vector rendering for a level, current resource availability in the computing device is determined. In one or more implementations, indications of an amount of memory available in the computing device, a number of textures available for use by the application, and a maximum texture dimension for the computing device are obtained. The resource usage if instanced rendering were used to render the current level is estimated, a number of textures instanced rendering would use is determined, and a texture dimension instanced rendering would use is determined. If the estimated amount of memory used to render the level is within a threshold amount of the memory available, or the number of textures instanced rendering would use exceeds the number of textures available, or the dimension of a texture instanced rendering would use exceeds a maximum texture dimension, then vector rendering is selected for the level. However, if the estimated amount of memory used to render the level if instanced rendering were used is not within the threshold amount of memory available, the number of textures instanced rendering would use does not exceed the number of textures available, and the dimension of textures instanced rendering would use exceeds a maximum texture dimension then instanced rendering is selected for the level. The selected vector rendering or instanced rendering is used to render data for the level to an offscreen buffer.

In response to determining to switch from using instanced rendering to vector rendering, the switchable rendering system obtains a raster graphic from the offscreen buffer. The raster graphic is the data (e.g., a bitmap) that has been written to the offscreen buffer for one or more levels so far. E.g., if the determination is made to switch from using instanced rendering to vector rendering between the third and fourth levels, then the raster graphic is a raster graphic of the data in the offscreen buffer resulting from rendering the first, second, and third levels. The obtained raster graphic is maintained in a cache. The switchable rendering system uses the cached raster graphic when using vector rendering to generate rendering data for the offscreen buffer.

In one or more implementations the switchable rendering system dynamically determines, for each level, whether to use instanced rendering or vector rendering based on resource availability. Resource availability often times changes as the switchable rendering system runs, so situations arise in which resource availability did not allow for instanced rendering for one level but does allow for instanced rendering for a subsequent level. The switchable rendering system is able to switch between instanced rendering and vector rendering any number of times.

Each time the switchable rendering system switches from using instanced rendering to vector rendering, the switchable rendering system obtains the raster graphic from the offscreen buffer and replaces any data in the cache with the obtained raster graphic. Raster graphics stored in the cache for lower levels need not be maintained after a raster graphic for a higher level is stored in the cache because the raster graphic for the higher level includes the data from the raster graphic in the lower level. For example, assume a nested repetition of five levels is being rendered with the first and second levels being rendered using instanced rendering, the third level being rendered using vector rendering, the fourth level being rendered instanced rendering, and the fifth level being rendered using vector rendering. In this example, the raster graphic from the second level is first stored in the cache and then replaced by the raster graphic from the fourth level. The raster graphic from the second level need not be maintained because the raster graphic from the fourth level includes the graphic data that is in the raster graphic from the second level.

After all of the levels in the nested repetition are rendered to the offscreen buffer, the data in the offscreen buffer is provided as nested repetition display data to a display module for display. The display module proceeds to display the nested repetition display data on a display device.

The techniques discussed herein allow dynamic switching between instanced rendering and vector rendering on a per level basis based on current resource availability when rendering each level. For example, instanced rendering is used to render a level in situations in which there is sufficient resource availability, allowing the rendering to be performed more quickly than using vector rendering. Furthermore, vector rendering is used to render a level in situations in which there is not sufficient resource availability, allowing the rendering to be performed without attempting to exceed resource availability.

Thus, in contrast to a solution using only vector rendering, the techniques discussed herein reduce performance issues that arise in vector rendering (e.g., time taken to perform the rendering) due to large numbers of copies of the base art. Furthermore, in contrast to a solution using only instanced rendering, the techniques discussed herein reduce performance issues that arise in instanced rendering (e.g., exceeding available memory or other resources) due to the large size of the art being rendered.

Term Descriptions

These term descriptions are provided for purposes of example only and are not intended to be construed as limiting on the scope of the claims.

The term "base art" refers to a pictorial image or graphic displayed, or generated to be displayed, on a display device. Examples of base art include lines, geometric shapes, raster graphics, combinations thereof, and so forth.

The term "repetition" refers to a base art being repeated in a given pattern. Examples of repetitions include repeating the base art in a circular or concentric pattern, repeating the base art in a radial pattern, repeating the base art in a symmetrical pattern along an axis, repeating the base art along a path pattern, and so forth.

The term "nested repetition" refers to multiple hierarchical levels of repetition, one within another. The base art or repeated base art in each hierarchical level is repeated in accordance with one of the patterns in a next higher hierarchical level. Examples of nested repetition include a base art repeated at a first level in a radial pattern and the resultant radial pattern repeated at a second level in a grid pattern, the resultant grid pattern repeated at a third level in a path pattern, and so forth.

The term "vector rendering" refers to rendering data based on mathematical formulas that establish points on a grid and connect those points with lines and curves (vector paths) to form various geometric shapes such as polygons, as well as rendering raster graphics.

The term "instanced rendering" refers to generating one or more affine transformation matrices indicating how a base art is to be repeated. The one or more affine transformation matrices are applied to the base art to create a repetition of the base art.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the generating nested repetitions for display using multiple rendering techniques described herein. The illustrated environment 100 includes a computing device 102, implemented in any of a variety of ways. Examples of the computing device 102 include a mobile device (e.g., assuming a handheld configuration such as a tablet or mobile phone), a wearable device (e.g., augmented reality or virtual reality headsets, smartwatches), a laptop computer, a desktop computer, a game console, an automotive computer, and so forth. Thus, implementations of the computing device 102 range from full resource devices with substantial memory and processor resources (e.g., personal computers, game consoles) to a low-resource device with limited memory and/or processing resources (e.g., mobile devices). Additionally, although a single computing device 102 is shown, additionally or alternatively the computing device is representative of a plurality of different devices, such as multiple servers utilized by a business to perform operations "over the cloud" as described in FIG. 7.

The computing device 102 is illustrated as including an application 104 that includes a switchable rendering system 106. The application 104 processes and transforms digital content 108, which is illustrated as maintained in storage 110 of the computing device 102. Such processing includes creation of the digital content 108 and rendering of the digital content 108 in a user interface 112 for output, e.g., by a display device 114. Although illustrated as being displayed, additionally or alternatively the UI is presented in other manners (e.g., audibly, haptically). The storage 110 is any of a variety of different types of storage, such as random access memory (RAM), Flash memory, solid state drive, magnetic disk drive, and so forth. Although illustrated as implemented locally at the computing device 102, additionally or alternatively functionality of the application 104, including the switchable rendering system 106, is implemented in whole or part via functionality available via a network 116, such as part of a web service or "in the cloud."

The computing device 102 also includes an operating system 118 that implements functionality to manage execution of application 104 as well as other applications on the computing device 102, to operate as an interface between the application 104 and hardware of the computing device 102, and so forth. The operating system 118 performs some resource management in the computing device 102, such as scheduling processes of the application 104 for execution, allocating memory to the application 104, and so forth.

The switchable rendering system 106 implements functionality to generate nested repetitions for display on the display device 114. For example, the user interface 112 includes a nested repetition 120 of a base art. As illustrated, the nested repetition 120 includes a base art of a rose at a first hierarchical level that, at a second hierarchical level is repeated in a radial pattern to generate a radial pattern of four roses, and at a third hierarchical level is repeated in a grid pattern to generate a 2×3 grid of four-rose radial patterns.

Although a single application 104 is illustrated in FIG. 1, any number of applications are includable in the computing device 102. Any additional applications included in the computing device 102 optionally include a switchable rendering system to generate nested repetitions for that application.

In general, functionality, features, and concepts described in relation to the examples above and below are employable in the context of the example systems and procedures described herein. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Switchable Rendering System Architecture

Figure 2:
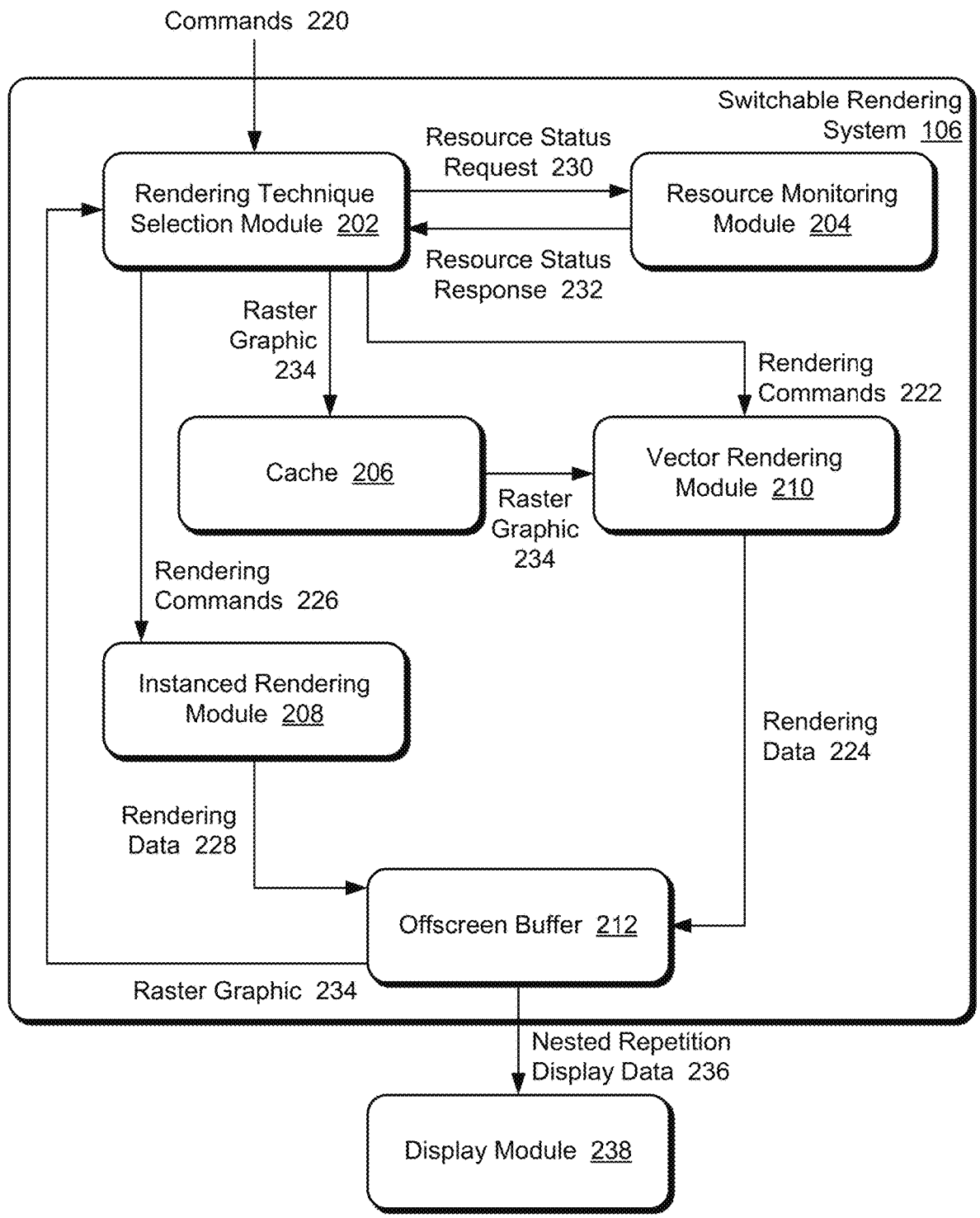
FIG. 2 is an illustration of an example architecture of a switchable rendering system.

FIG. 2 is an illustration of an example architecture of a switchable rendering system 106. The switchable rendering system 106 includes a rendering technique selection module 202, a resource monitoring module 204, a cache 206, an instanced rendering module 208, a vector rendering module 210, and an offscreen buffer 212.

Figure 3:
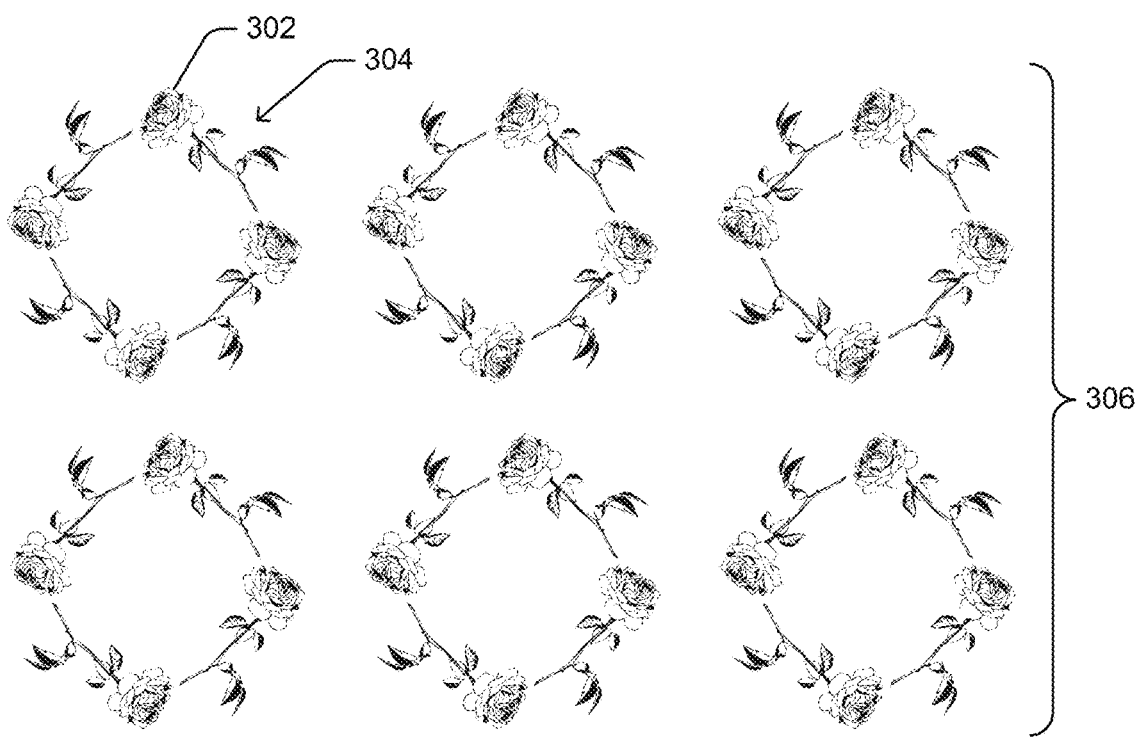
FIGS. 3 and 4 illustrate examples of nested repetitions of a base art.
Figure 4:
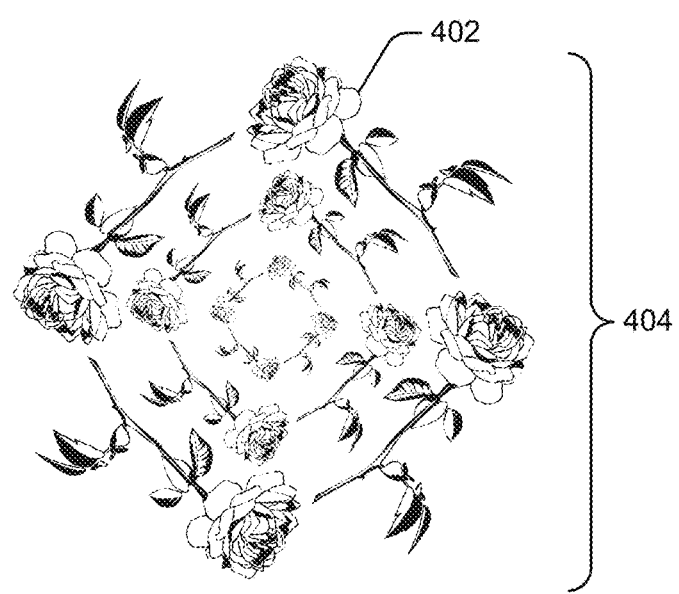

The switchable rendering system 106 generates nested repetitions for display using a combination of vector rendering and instanced rendering. FIGS. 3 and 4 illustrate examples of nested repetitions. FIG. 3 illustrates a base art 302 that is a rose. The base art 302 is repeated in a radial pattern 304 with four roses in the pattern. The radial pattern 304 is then repeated in a 2 by 3 grid pattern as illustrated at 306. FIG. 3 illustrates multiple (three) hierarchical levels: a first level (e.g., the lowest or inner-most level) that is the base art 302, a second level (e.g., interior or mid level) that is the radial pattern 304, and a third level (e.g., the highest or top-most level) that is the 2 by 3 grid pattern 306.

FIG. 4 illustrates a base art 402 that is a rose. As illustrated at 404, the base art 402 is repeated in a radial pattern with four roses in the pattern, and the radial pattern of four roses is then repeated in a concentric circle pattern with three concentric circles illustrated at 404. FIG. 4 illustrates multiple (three) hierarchical levels: a first level (e.g., the lowest or inner-most level) that is the base art 402, a second level (e.g., interior or mid level) that is the radial pattern of four roses, and a third level (e.g., the highest or top-most level) that is the concentric circle pattern 404.

Returning to FIG. 2, in general the rendering technique selection module 202 receives commands 220 describing a nested repetition to be generated. The rendering technique selection module 202 coordinates generation of the nested repetition based on the commands 220. For each level of the nested repetition, the rendering technique selection module 202 selects the instanced rendering module 208 or the vector rendering module 210 to generate rendering data for the level. The rendering technique selection module 202 makes the selection based on current resource availability in the computing device 102 as determined by the resource monitoring module 204. After all of the levels in the nested repetition are rendered to the offscreen buffer 212, the data in the offscreen buffer 212 is provided to a display device for display.

The rendering technique selection module 202 receives commands 220 describing a nested repetition to be generated by the switchable rendering system 106. In one or more implementations, the commands 220 indicate user inputs identifying a base art for the nested repetition, one or more patterns to use for the nested repetitions (e.g., a pattern for each of the multiple hierarchical levels of the nested repetition), and the number of hierarchical levels to include in the nested repetition. Additionally, or alternatively, the commands 220 are received from other sources, such as another device or system.

The rendering technique selection module 202 receives the base art for the nested repetition from any of various sources. In one or more implementations, the base art itself is included in a command 220. Additionally, or alternatively, a command 220 includes an identifier of a location from which the base art is retrieved by the rendering technique selection module 202. The base art takes any of various forms and is typically a vector rendering including various vector paths.

The rendering technique selection module 202 provides rendering commands 222 to the vector rendering module 210, which provides rendering data 224 to the offscreen buffer 212 for one or more of the levels in the nested repetition. The vector rendering module 210 uses vector graphics or vector rendering, which renders data based on mathematical formulas that establish points on a grid and connect those points with lines and curves (vector paths) to form various geometric shapes such as polygons. The vector paths have various properties such as colors, shapes, fills, thicknesses, and so forth. The vector rendering module 210 also renders graphics (e.g., raster graphics), such as based on data in the offscreen buffer 212 as discussed in more detail below. The rendering commands 222 indicate, based on the commands 220, what data to render.

The rendering technique selection module 202 provides rendering commands 226 to the instanced rendering module 208, which provides rendering data 228 to the offscreen buffer 212 for one or more of the levels in the nested repetition. The rendering commands 226 indicate, based on the commands 220, an art and a pattern that the instanced rendering module 208 uses to generate the rendering data 228. For a first level (the lowest of the multiple hierarchical levels), the rendering commands 226 identify or include the base art. For a subsequent level, the rendering commands 226 identify a repetition (e.g., a raster graphic from the offscreen buffer 212) from the immediately preceding level. For example, if the second and third levels are both rendered using instanced rendering, the art identified in the command 226 for the third level is the raster graphic in the offscreen buffer 212 rendered in the second level.

Generally, the instanced rendering module 208 builds affine transformation matrices to be applied to the base art based on the indicated pattern. In contrast to systems generating individual copies of the base art for each replication, the instanced rendering module 208 forms matrices of desired base art graphics replications that are all applied to a single instance of the base art. A transformation to a base art is processed (e.g., by the instanced rendering module 208 or another module or system) to generate one or more affine transformation matrices for repetitions from parsed operations. For example, an affine transformation matrix is generated for each transformation resulting in a repetition. For each transformation, the affine transformation matrix encapsulates the operations performed on a base art to create the repetition. Each affine transformation matrix is applied to the base art to create a repetition. Accordingly, rather than re-drawing the base art (e.g., the rose in FIGS. 3 and 4), which oftentimes have complex attributes such as gradients or thousands of paths, the instanced rendering module 208 generates the affine transformation matrix to create the repetition.

The instanced rendering module 208 employs the affine transformation matrix to generate repetitions in any of a variety of patterns. For a given transformation, the instanced rendering module 208 identifies operations and operation configuration data, which are values relevant to each operation. Based on the type of operation, the instanced rendering module 208 generates coefficients that reside in particular positions within the affine transformation matrix. The instanced rendering module 208 multiplies the affine transformation matrix with the coordinates of base art to generate a repetition.

In some situations, each repetition requires more than one affine transformation matrix to achieve the desired repetition. The order of application of multiple affine transformation matrices to the base art is also modified depending on the repetition pattern selected. In some situations, the multiple affine transformation matrices are multiplied to create one affine transformation matrix. However, the order of multiplying the matrices affects the order in which the corresponding operations are applied to a base art. The instanced rendering module 208 employs the affine transformation matrices one-by-one to create multiple repetitions by multiplying the affine transformation matrix with the coordinates of the base art.

Instanced rendering performed by the instanced rendering module 208 is discussed in more detail in the following. The instanced rendering module 208 generally operates to receive a transformation (e.g., as identified by the indicated pattern in a command 220) and a base art and generate a repetition by applying the transformation to the base art. The base art is stored, for example, as a raster graphic or vector graphics. A repetition of base art appears, for example, as a modified replication of the base art on a display screen. Repetitions are generated by applying an affine transformation matrix to the base art.

The instanced rendering module 208 constructs one or more affine transformation matrices from the transformation and employs the affine transformation matrices when creating the repetition. As part of this process, the instanced rendering module 208 generates operations from the transformation and employs those operations in building the affine transformation matrix(ices). The transformation refers to, for example, one or more operations that modify the base art to create a repetition of the base art in accordance with a pattern.

The instanced rendering module 208 generates an operation or set of operations for a transformation. An operation comprises one or more modifications to the base art to apply the transformation to the base art in order to generate the repetition. An operation refers to, for example, a modification to the base art. In one or more implementations, operations include shearing, scaling, translating, reflecting, and rotating the base art. For example, if the transformation was to create a radial pattern repetition of base art, the operations are to translate and rotate the replication of the base art into the desired position and at the desired angle in a circular pattern. Operations are oftentimes associated with "operation configuration data," which specify values used to implement the operations to achieve the desired transformation to the base art. For example, operation configuration data for a translation operation includes the changes in the x- and y-directions to generate a repetition of the base art in the desired location in the final display data.

In other words, the transformation is broken down into an operation or a set of operations such as shearing, scaling, translating, reflecting, and rotating the base art. The process of parsing the transformation into one or more operations translates the necessary modifications to create the repetition into coefficients that are expressed using an affine transformation matrix, which is a highly efficient mechanism to capture multiple operations to perform on a replication of the base art.

In one or more implementations, the instanced rendering module 208 parses the transformation into one or more operations and identifies corresponding operation configuration data. The format of operation configuration data varies by operation type. For example, operations involving rotation require the degrees of rotation (expressible in various forms) and the center that the base art is rotated around. Moreover, the operation configuration data for operations involving scaling of the base art represents the resizing of the replication relative to the base art and is expressible as percentages or the decimal form of percentages. Operation configuration data for translation of the base art is often expressed as distances in a coordinate system. For each transformation, the operation module associates the operation with each respective operation configuration data.

The instanced rendering module 208 generates an operation for the transformation by determining changes to the base art to apply the transformation. To determine the necessary changes to the base art to generate the transformation, a lookup table storing the set of associated operations for a transformation is retrieved from a data store. Based on the transformation, the corresponding entry in the lookup table is accessed and an associated operation or set of operations is parsed from the transformation. For example, to parse corresponding operations for a grid pattern repetition, the lookup table is retrieved, the corresponding entry accessed, and the necessary translation and scaling operations are parsed from the grid pattern repetition transformation.

In one or more implementations, a user interface is provided that prompts a user to provide input that identifies the type of repetition or pattern to create (e.g., grid, radial, concentric, symmetry, or path pattern) and the operation configuration data for the related operations. For example, for a grid pattern repetition, a user inputs the number of rows and columns in the grid along with the spacing between the grid cells. In one or more implementations, the change in coordinates of the transformed base art determines the operations and operation configuration data. For example, the instanced rendering module 208 calculates the change in coordinates from a user resizing and rotating the base art and expresses the amount of resizing of the repetition as a percentage. The operations are used to generate an affine transformation matrix(ices).

The instanced rendering module 208 constructs an affine transformation matrix(ices) from the operations derived from the transformation. The affine transformation matrix built by the instanced rendering module 208 encapsulates multiple operations to perform on the base art, including the operation configuration data. In one or more implementations, an "affine transformation matrix" refers to a matrix that describes the transformations to apply to base art to create a repetition. For example, assume an affine transformation matrix is a 3×3 matrix with 6 coefficients "a," "b," "c," "d," "e," and "f," that determine the scaling, translation, reflection, shear, and rotation to apply to the base art to produce a repetition. In this example, the "a" and "d" coefficients represent scaling along the x- and y-directions, respectively. Likewise, the "a," "b," "c," and "d" coefficients represent rotation. The "e" and "f" coefficients represent translation along the x- and y-directions, respectively. Using such coefficients, the affine transformation matrix is represented with the following notation:

$$M = \begin{bmatrix} a & b & e \\ c & d & f \\ 0 & 0 & 1 \end{bmatrix}$$

As such, the affine transformation matrix provides a mechanism for efficient capture of operations on the base art to apply the transformation and create the repetition by: avoiding storing multiple copies of memory-intensive base art, avoiding storage of multiple operations as separate data structures, and reducing the computation load on graphics processing units.

In one or more implementations, the instanced rendering module 208 builds the affine transformation matrix(ices) by identifying operation types and the operation configuration data for a particular transformation. The instanced rendering module 208 determines which coefficient in the affine transformation matrix represents each operation and incorporates the operation configuration data into the coefficient. This process is performed for each operation contained in the transformation. In one or more implementations, a separate affine transformation matrix is generated for each operation or set of operations. Additionally, the instanced rendering module 208 determines the order in which operations and the operation configuration data are incorporated into coefficients based on the transformation. Likewise, multiple affine transformation matrices are multiplied, following the order that operations are applied, to create one affine transformation matrix representing multiple operations.

The affine transformation matrix(ices) is(are) stored in a data store (e.g., storage 110 of FIG. 1), for use in applying the transformation to the base art. In one or more implementations, the affine transformation matrix(ices) is(are) stored in the CPU memory or GPU memory. Additionally, or alternatively, other types of data structures are employed.

The instanced rendering module 208 employs the affine transformation matrix to apply the transformation to the base art in order to provide a repetition. In operation, the instanced rendering module 208 accesses the base art and retrieves the affine transformation matrix stored in the data store to apply the transformation to the base art. In one or more implementations, the base art is stored in the data store for retrieval by the instanced rendering module 208.

The instanced rendering module 208 applies the affine transformation matrix to the base art by multiplying coordinates of the base art with coefficients of the affine transformation matrix. For each set of the coordinates of the base art's points identified by the instanced rendering module 208, the instanced rendering module 208 multiplies the affine transformation matrix(ices) with the coordinates to generate a new set of coordinates of the repetition. The order in which multiple affine transformation matrices are multiplied with the coordinates is determined by the order of operations applied to the base art. In one or more implementations, the coordinates of the corners in the base art represented as a raster graphic are multiplied by the matrices.

In one or more implementations, prior to multiplying the coordinates with the matrices, the instanced rendering module 208 sends the base art, represented as a vector graphics, to the GPU to deconstruct the base art into triangles and process them one-by-one. The instanced rendering module 208 then retrieves the points in the base art, which are the beginning and endpoints to vectors in the base art. For example, if the base art is stored as vector graphics that are to be scaled by 150% in a concentric pattern repetition, the instanced rendering module 208 determines the new coordinates of each point in each replication by multiplying the coordinates for each point from the base art with the respective affine transformation matrix.

With vector graphics, however, the GPU only processes the base art one time and relies on affine transformation matrices to generate all repetitions. For example, a first affine transformation matrix is multiplied with the base art (that was previously processed by the GPU) to generate the coordinates for a first repetition of the base art scaled by 150%. Then, a second affine transformation matrix is multiplied with the coordinates of the base art to generate the location coordinates of a second repetition 150% larger than the first repetition. As described below, once the coordinates have been determined, the GPU then draws the graphic, or output, without the need to deconstruct the first and second repetitions into triangles for final graphic rendering. By processing the base art in the GPU once and then applying the affine transformation matrix(ices) to the base art to create repetitions, the memory and resources used to generate the final graphic are vastly reduced. Instead of the GPU processing multiple copies of the base art, resources are consolidated to process the base art once.

The multiplication with the coordinates of the base art occurs separately for each affine transformation matrix. In one or more implementations, there are at least N multiplications occurring, where N is the number of repetitions. Some processors, however, are able to optimize multiplication of multiple matrices into fewer operations. In one or more implementations, the instanced rendering module 208 retrieves the affine transformation matrix(ices) from the CPU memory and uploads it to the GPU memory for multiplication described above and for rendering of the final graphic described below.

Using the coordinates of the repetition, the final graphic is rendered. In one or more implementations, with the GPU having processed the base art, which was formatted as a vector graphics, as mentioned above, the GPU merely draws or renders the vectors represented by the new set of coordinates to produce the final graphic. Likewise, in one or more implementations, where the base art is a raster graphic, the GPU multiplies the coordinates of the corners of the base art with the matrices to determine the bounds of the graphic and resamples the pixels within accordingly. A repetition is generated that represents the transformation performed on the base art based on the application of the affine transformation matrix on the base art.

In one or more implementations, the generated repetition is then output as a raster graphic that is usable to create another repetition. New affine transformation matrices are generated and applied to the repetition. By using repetition as the base art to create another level or layer of repetitions, the system creates a nested repetition using affine transformation matrix(ices).

The instanced rendering module 208 determines operation configuration data for each operation. The different types of patterns require operation configuration data that is particular to the pattern as described in more detail below. In one or more implementations, a user's dynamic interaction with a graphical user interface of the computing device 102 determines the types of operations and corresponding operation configuration data. For example, assume a user selects a radial pattern repetition with seven repetitions spanning 60 degrees around a center with coordinates (1, 6). Similarly, if a user selects the option to rotate the base art and positions the base art into the desired rotated position, the degree of rotation for the repetition is determined from the original position of the base art.

The values input by the user serve to determine the types of operations and operation configuration data that derive the coefficients that populate the affine transformation matrix. The instanced rendering module 208 generates coefficients for the affine transformation matrix are generated.

The transformations and parsed operations are distilled and expressed in the coefficients of the affine transformation matrix. For example, the coefficients of an affine transformation matrix with 6 coefficients "a," "b," "c," "d," "e," and "f" are modified to determine the scaling, translation, reflection, and rotation to apply to the base art. Using the operation type and operation configuration data, the coefficients are calculated accordingly. The operation type determines which coefficient is modified, while the operation configuration data determines the value of the coefficient. To provide uniformity, some operation configuration data is optionally converted into other forms, such as expressing the amount of rotation as degrees versus radians.

The type of operations determines which coefficient is modified. Operations involving scaling in the x- and y-directions affect the "a" and "d" coefficients, respectively. Likewise, operations for rotating the base art affect the "a," "b," "c," and "d" coefficients. Operations pertaining to translation in the x- and y-directions modify the "e" and "f" coefficients, respectively. The affine transformation matrix, using the following notation, shows the placement of each coefficient:

$$M = \begin{bmatrix} a & b & e \\ c & d & f \\ 0 & 0 & 1 \end{bmatrix}$$

However, the size and number of coefficients in the affine transformation are modified based on the number of dimensions in the coordinate system of the base art.

The operation configuration data for each operation is then integrated into each coefficient based on the type of operation. The description of how operation configuration data is integrated into each coefficient for a variety of patterns is described in more detail below. In one or more implementations, the affine transformation matrix(ices) are calculated by a CPU and stored within the CPU memory.

The affine transformation matrix is then applied to the base art. This involves determining the points of the base art and obtaining the coordinates for each point. Once retrieved, the coordinates are multiplied with the affine transformation matrix. In one or more implementations, the base art is stored as vector graphics and the points in the base art are the beginning and end of each vector. For raster graphics, the coordinates are the corners of the graphic. As described above, the application of the affine transformation matrix (ices) optionally involves having the GPU process the base art prior to multiplication. In one or more implementations, rows and columns are added to both the base art's coordinates and the affine transformation matrix(ices) to homogenize coordinate systems and facilitate multiplication.

If a particular transformation requires more than one affine transformation matrix to achieve the desired result, each set of coordinates is multiplied by each of the affine transformation matrix. The order of multiplication of the matrices is also dictated by the transformation. Likewise, multiple affine transformation matrices are optionally consolidated into one matrix, with the order of matrix multiplication reflecting that of the operations. For example, reflecting the base art across an axis and then rotating the base art oftentimes does not produce the same transformation as rotating the base art and then reflecting it across the same axis. Likewise, in a repetition of prior repetitions, application of affine transformation matrices to earlier repetitions is performed first in order to facilitate the creation of the follow-on repetitions.

In one or more implementations, the application of the affine transformation matrix, however, takes place within the GPU and the result is stored in the GPU memory. The affine transformation matrix(ices) are first uploaded from the CPU memory into the GPU memory and then the GPU draws the final graphic of repetitions.

Building a grid pattern (also referred to as a grid pattern repetition) is described in the following. In one or more implementations, grid pattern repetition refers to a repetition of base art in every cell in a grid with a designated number of rows and columns. For example, in a grid having 2 rows and 4 columns, the grid pattern repetition would create 8 repetitions to ensure there is a repetition in every cell of the grid.

A base art selection and the transformation to apply to the base art are received. For example, the user selects through a graphical user interface to create a grid pattern repetition. The user optionally specifies operation configuration information regarding the number of rows and columns in the grid pattern repetition along with the spacing between grid cells.

The operation(s) is(are) then parsed from the transformation, which involves determining the type of operation and the operation configuration data. The operations performed for a grid pattern repetition are translating, and in one or more implementations, scaling, repetitions into a position in the grid with uniform grid spacing. Operation configuration data such as the spacing between cells, the number of rows and columns, and the number of cells in the grid are also parsed. The operation configuration data is optionally input by the user through a user interface. For example, if the user selected the option to create a grid with 2 rows and 3 columns, the number of cells to create repetitions for would be 6. By multiplying the number of columns and rows in the grid pattern, the number of cells (and thus) repetitions to create is determined.

For a given cell, the coefficients for an affine transformation matrix are generated. The coefficients are determined based on the parsed operations and operation configuration data. A grid pattern repetition using a 3×3 affine transformation matrix sets the coefficients accordingly:

$a=d=1$ $b=c=0$ $e_{ij}=j*(S_{col}+B_{width})$ $f_{ij}=i*(S_{row}+B_{height})$

The subscripts i and j represent the $i^{th}$ row and the $j^{th}$ column in the grid pattern. For example, the affine transformation matrix created for the cell in the first row and second column would have the following values: i having a value of 1 and j having a value of 2. Additionally, $S_{row}$ and $S_{col}$ respectively represent the row and column spacing among grid cells. Moreover, the value $B_{width}$ and $B_{height}$ represent the width and height of the base art.

The coefficient values are populated for each grid cell in the grid pattern using the operation configuration data. In one or more implementations, the values of i and j are incremented until all of the cells have been iterated through. In one or more implementations, each grid cell has more than one affine transformation applied to create that repetition. Any size of matrix and number of coefficients are employable by the instanced rendering module 208. The process of generating coefficients for an affine transformation matrix(ices) for each cell in the grid pattern repetition is repeated until all of the grid cells have been processed.

After all of the cells have been processed, the affine transformation matrix(ices) is (are) applied to the base art. If there is more than one affine transformation matrix, each matrix is applied one-by-one to the base art, following the order of operations in the transformation.

Building a radial pattern (also referred to as a radial pattern repetition) is described in the following. In one or more implementations, radial pattern repetition refers to repetitions of base art in a circular pattern around a designated center for a specified number of degrees. For example, each repetition of the radial pattern repetition is scaled or sized independent of the others. E.g., assume one repetition is scaled by 150% in the radial pattern repetition, while the second and third repetitions are scaled by 70% and 200%, respectively. In this example, despite the varying sizing and scaling, each repetition is rotated around a center for a designated number of degrees.

A base art selection and thee transformation to apply to the base art are received. For example, the user selects through a graphical user interface to create a radial pattern repetition. The user also optionally includes information regarding the radius, the center of the radial pattern repetition, and the center point of the base art. Likewise, the user optionally provides the start angle of repetitions around the center, the total angle between the first and last repetitions, and the total number of repetitions.

The operation(s) is(are) then parsed from the transformation, which involves determining the type of operation and the operation configuration data. For a radial pattern repetition, the operations involve rotating and translating each repetition. Operation configuration data includes information such as the radius, centers of the repetition and the base art along with the angle the repetition continues for and the total number repetitions. As mentioned above, the operation configuration data is optionally input by the user through a user interface.

For each repetition in the radial pattern, an affine transformation matrix is created. For a given repetition in the pattern, the coefficients for an affine transformation matrix are generated. The coefficients are determined based on the parsed operations and the operation configuration. A radial pattern repetition using a 3×3 matrix sets the coefficients accordingly:

$$a_i = d_i = \sin\Phi_i$$

$$b_i = -\cos\Phi_i$$

$$c_i = \cos\Phi_i$$

$$e_i = -B_{c_x} * \sin\Phi_i + B_{c_y} * \cos\Phi_i + R_{c_x} + R_r * \cos\Phi_i$$

$$f_i = -B_{c_x} * \cos\Phi_i - B_{c_y} * \sin\Phi_i + R_{c_y} + R_r * \sin\Phi_i$$

$$\Phi_i = R_{\Phi_s} - \left(\frac{R_{\Phi_t}}{N}\right) * i$$

The subscript i represents the $i^{th}$ repetition in the radial pattern, with i having values between a range of 0 and N−1. For example, the affine transformation matrix created for the fourth repetition has a value of i as 3. Additionally, $B_{c_x}$ and $B_{c_y}$ represent the coordinates for the center of the base art, while $R_{c_x}$ and $R_{c_y}$ represent the center of the radial pattern with a radius $R_r$. The value $\Phi_i$ represents the angle subtended by the given repetition about the x-axis and is calculated for each repetition as shown above. Moreover, the values $R_{\Phi_s}$ and $R_{\Phi_t}$ represent the starting angle that the first repetition is placed at and the total angle between the first and last repetitions, respectively. N represents the total number of repetitions.

The coefficient values are generated for each repetition in the radial pattern using the operation configuration data. In one or more implementations, the value of i is incremented for each repetition in the radial pattern. In one or more implementations, each repetition in the radial pattern has more than one affine transformation applied to create that repetition. Any size of matrix and number of coefficients are employable by the instanced rendering module 208. The process of creating an affine transformation matrix(ices) for each repetition in the radial pattern is repeated until all of the repetitions in the pattern have been processed.

After all of the repetitions have been processed, the affine transformation matrix(ices) is (are) applied to the base art. If there is more than one affine transformation matrix, each matrix is applied one-by-one to the base art, following the order of operations in the transformation.

Building a concentric pattern (also referred to as a concentric pattern repetition) is described in the following. In one or more implementations, concentric pattern repetition refers to repetitions of base art scaled in size and layered on top of one another, where a successive repetition is increasingly scaled compared to the repetition preceding it. For example, in a concentric pattern repetition including three repetitions, the first repetition appears as an instance of the base art scaled by 150%. In this example, the second concentric pattern repetition appears as another instance of the base art 150% larger than the first repetition. Likewise, the third concentric pattern repetition appears as an instance 150% larger than the second concentric pattern repetition. Given that each repetition is larger than the first, the smaller repetitions are placed on top of the larger repetitions. The same applies to successively smaller concentric pattern repetitions, with smaller repetitions placed on top of larger repetitions.

A base art selection and the transformation to apply to the base art are received. For example, the user select throughs a graphical user interface to create a concentric pattern repetition. The user optionally specifies information regarding the amount of scaling per repetition.

The operation(s) is(are) then parsed from the transformation, which involves determining the type of operation and the operation configuration data. For a concentric pattern, the operations involve scaling each repetition more than the preceding repetition. Operation configuration data such as the amount of scaling are also parsed. The operation configuration data is optionally input by the user through a user interface. In one or more implementations, the scaling between successive repetitions are not uniform.

For each repetition in the concentric pattern repetition, an affine transformation matrix is created. For a given repetition, the coefficients for an affine transformation matrix are determined based on the parsed operations. A concentric pattern repetition using a 3×3 matrix sets the coefficients accordingly:

$$a_i = d_i = 1 - i/N$$

$$b = c = 0$$

$$e = f = 0$$

The subscript i represents the $i^{th}$ repetition in the concentric pattern, with i having a range of values between 0 and N−1. For example, the affine transformation matrix created for the fourth repetition has a value of i as 3.

The coefficient values are generated for each matrix for each repetition in the concentric pattern using the operation configuration data. In one or more implementations, the value of i is incremented until all of the repetitions have been iterated through. In one or more implementations, each repetition in the concentric pattern has more than one affine transformation applied to create that repetition. Any size of matrix and number of coefficients are employable by the instanced rendering module 208. The process of creating an affine transformation matrix(ices) for each repetition in the concentric pattern repetition is repeated until all of the repetitions in the pattern have been processed.

After all of the repetitions have been processed, the affine transformation matrix(ices) is (are) applied to the base art. The affine transformation matrix(ices) are also applied in order to reflect all repetitions. In one or more implementations, successively larger repetitions are placed behind the preceding repetition in order to show all repetitions. Similarly, successively smaller repetitions are placed on top of the preceding repetition in order to show all of the smaller repetitions created without having a larger repetition block the view of a smaller one. If there is more than one affine transformation matrix, each matrix is applied one-by-one to the base art, following the order of operations in the transformation.

Building a symmetry pattern (also referred to as a symmetry pattern repetition) is described in the following. In one or more implementations, symmetry pattern repetition refers to repetitions of base art reflected across an axis and rotated to appear as a mirror graphic of the base art or a portion of the base art.

A base art selection and the transformation to apply to the base art are received. For example, the user selects through a graphical user interface to create a symmetry pattern repetition. The user optionally specifies information regarding the axis that the symmetry takes place across along with the angle for rotation of the base art around the x-axis.

The operation(s) is(are) then parsed from the transformation, which involves determining the type of operation and the operation configuration data. For a symmetry pattern, there are at least two repetitions. The first repetition creates the base art, while the second repetition creates the symmetric counterpart to the base art. The operations involve reflecting and rotating the base art to create the second repetition. Operation configuration data such as the angle of rotation, the coordinates of the axis to reflect the base art are also parsed, and a location of where the first repetition are to be positioned. The operation configuration data is optionally input by the user through a user interface. For each repetition in the symmetry pattern, an affine transformation matrix is created.

For each repetition, the coefficients for an affine transformation matrix are determined based on the parsed operations. The first repetition involves creating a repetition of the base art aligned with the axis of reflection, which involves generating coefficients to translate the base art into the correct position. The second repetition involves reflecting the base art across an axis and rotating the base art around the x-axis. A symmetry pattern repetition using a 3×3 matrix sets the coefficients accordingly:

$a = \cos(2*\Phi)$ $b = c = \sin(2*\Phi)$ $d = -\cos(2*\Phi)$ $e = -S_x * \cos(2*\Phi) - S_y * \sin(2*\Phi) + S_x$ $f = -S_x * \sin(2*\Phi) + S_y * \cos(2*\Phi) + S_y$ $S_x$ and $S_y$ represent the coordinates about which the axis of reflection is centered, while $\Phi$ represents angle that the second repetition is rotated around the x-axis. In one or more implementations, each repetition in the symmetry pattern has more than one affine transformation applied to create that repetition. Any size of matrix and number of coefficients are employable by the instanced rendering module 208.

The affine transformation matrix(ices) is (are) applied to the base art. If there is more than one affine transformation matrix, each matrix is applied one-by-one to the base art, following the order of operations in the transformation.

Building a path pattern (also referred to as a path pattern repetition) is described in the following. In one or more implementations, path pattern repetition refers to repetitions of base art along a path.

A base art selection and the transformation to apply to the base art are received. For example, the user selects through a graphical user interface to create a path pattern repetition. The user optionally specifies information regarding which path or curve the repetitions are to align with and the number of desired repetitions. In one or more implementations, the path is an arbitrary path drawn by the user. The operations are parsed from the transformation and the operations involve translating and rotating the repetitions into the correct position. Operation configuration data such as the number of repetitions and a path to align with the repetitions are also parsed. The operation configuration data is optionally input by the user through a user interface. For each repetition in the path pattern repetition, an affine transformation matrix is created as follows.

Straight lines approximating the curve selected by the user are generated. The path created by the user is decomposed into a set of straight lines approximating the curve. The approximating straight lines are tangent to the curve and are used to express the curve as a series of short, straight line segments. In one or more implementations, prior to decomposing the path into a set of straight lines, the path drawn by the user is first deconstructed into a series of Bezier curves.

For the straight line approximations, the total length of the line segments is calculated. In one or more implementations, each straight line is the same length and the total length of the line segments is calculated by multiplying the number of line segments with the length of each line segment. In one or more implementations, each straight line is not uniform and the total is calculated by summing each individual line segment's length. Additionally, the straight line approximations are optionally calculated from the Bezier curves that model the path drawn by the user.

A grid pattern repetition as discussed above is performed for a grid with 1 row and a number of columns equal to the number of desired repetitions. This provides affine transformation matrix(ices) for a single row of repetitions that span the total length of the line segments. Any method of creating repetitions to span the total length of the path is employable by the instanced rendering module 208. These repetitions, however, are not yet in positions aligned with the path.

The repetitions are mapped to locations on the original path. The grid pattern repetition spanning the total line segment length with a row of repetitions is deconstructed into the line segments to determine which portion of the original path the repetition belongs to. These short line segments with a set of corresponding repetitions is then associated with a point on the original path. In one or more implementations, if a line segment contains one repetition, the coordinates of the point where the tangent line segment intersects with the original path are obtained. These coordinates are the location on the original path that the repetition is to be placed in. If multiple repetitions are associated with a line segment, the repetitions are equally spaced on the line segment and the coordinates of the nearest points on the original path are calculated. Any method of distributing repetitions on the line segments is employable by the instanced rendering module 208.

For a given repetition, the angle of the path where the repetition is located on the path is determined. Using the mapped coordinates back to the original path, the angle of rotation of the repetition on the path is determined. In one or more implementations, the corresponding line segment for that portion of the path is retrieved and the angle of rotation is determined by obtaining the slope of that tangent line segment. In one or more implementations, the angle of rotation is determined by taking a derivative of a Bezier curve at the point that the repetition is mapped back to on the path.

For a given repetition, the coefficients for affine transformation matrix(ices) is(are) modified. The coefficients in the affine transformation matrix(ices) are then modified to reflect the operation configuration data. A path pattern repetition using a 3×3 matrix modifies the coefficients accordingly:

$a_i = d_i = \cos \Phi_i$ $b_i = \sin \Phi_i$ $c_i = -\sin \Phi_i$ $e_i = -B_{c_x} * \cos \Phi_i - B_{c_y} * \sin \Phi_i + L_x$ $f_i = B_{c_x} * \sin \Phi_i - B_{c_y} * \cos \Phi_i + L_y$ The subscript i represents the $i^{th}$ repetition in the path pattern. For example, the affine transformation matrix created for the fourth repetition has a value of i as 4. The value $\Phi_i$ represents the angle of rotation for each repetition on the path based on the mapped location. Additionally, $B_{c_x}$ and $B_{c_y}$ represent the coordinates for the center of the base art, while $L_x$ and $L_y$ represent the translation of a repetition with respect to the base art to the mapped location on the path in the x- and y-directions, respectively.

These coefficient values are generated for each matrix for each repetition in the path pattern. For each repetition, the value of i is incremented. In one or more implementations, each repetition in the path pattern has more than one affine transformation applied to create that repetition. Any size of matrix and number of coefficients are employable by the instanced rendering module 208. The process of creating an affine transformation matrix(ices) for each repetition in the path pattern repetition is repeated until all of the repetitions in the pattern have been processed.

After all of the repetitions have been processed, the affine transformation matrix(ices) is (are) applied to the base art. If there is more than one affine transformation matrix, each matrix is applied one-by-one to the base art, following the order of operations in the transformation.

The rendering technique selection module 202 selects, for each level of the nested repetition, the instanced rendering module 208 or the vector rendering module 210 to generate rendering data for the level. To make this selection, the rendering technique selection module 202 communicates a resource status request 230 to the resource monitoring module 204. The resource monitoring module 204 determines current resource availability in the computing device 102 and returns an indication of the current resource availability in the computing device 102 to the rendering technique selection module 202 as a resource status response 232. In one or more implementations, the resource status request 230 is a request for availability of all resources that the resource monitoring module 204 is aware of. Additionally, or alternatively, the resource status request 230 specifies one or more particular resources (e.g., memory) for which availability is desired.

The resource monitoring module 204 obtains information regarding availability of various resources in the computing device 102, such as various hardware limits (e.g., memory or graphics processing unit (GPU) limits), various software or firmware limits (e.g., limits of the GPU driver), and so forth. The resource monitoring module 204 obtains this information regarding availability of resources in the computing device 102 in any of a variety of different manners, such as by querying the operating system 118, subscribing to messages or notifications from the operating system 118 or other components or programs of the computing device 102, and so forth.

In one or more implementations, the resource monitoring module 204 obtains an indication of an amount of memory available in the computing device 102, a number of textures available for use by the application 104, and a maximum texture dimension for the computing device 102. The amount of memory available varies over time based on the amount of memory used by the application 104, the amount of memory allocated to the application 104 by the operating system 118, the amount of memory used by other applications on the computing device 102, the amount of memory used by the operating system 118, and so forth. The number of textures available for use by the application 104 varies over time based on the number of textures already used by the application 104, the number of textures supported by a GPU of the computing device 102, and so forth. The maximum texture dimension for the computing device 102 varies based on the number of textures supported by a GPU of the computing device 102 or a GPU driver of the computing device 102.

The rendering technique selection module 202 receives the resource status response 232 from the resource monitoring module 204 that indicates current resource availability in the computing device 102. The rendering technique selection module 202 generates an estimate of the resource usage by the instanced rendering module 208 if instanced rendering were used to render the current level. In one or more implementations, the rendering technique selection module 202 generates an estimate of the amount of memory the instanced rendering module 208 would use for a level by determining the size of the raster graphic resulting from applying the transformation matrix for the pattern of the level to the base art. The estimated size of the raster graphic accounts for the amount of zooming that is supported by the application 104. For example, the size of the raster graphic is large enough so that the raster graphic is displayable at a maximum zoom amount supported by the application 104.

The rendering technique selection module 202 knows the number of textures the instanced rendering module 208 would use based on the textures indicated in the commands 220.

The rendering technique selection module 202 analyzes the estimate of the resource usage by the instanced rendering module 208 if instanced rendering were used to render the current level in determining whether to select instanced rendering or vector rendering for the level. In one or more implementations, if the estimated amount of memory the instanced rendering module 208 would use to render the level is within a threshold amount of the amount of memory available then the rendering technique selection module 202 selects vector rendering for the level. However, if the estimated amount of memory the instanced rendering module 208 would use to render the level is not within the threshold amount of the amount of memory available then the rendering technique selection module 202 selects instanced rendering for the level. This threshold amount is set so that all of the available memory is not used in rendering the level, thereby avoiding potential issues with the computing device 102 due to no available memory, such as the application 104 crashing or the computing device 102 shutting down. As an example, the rendering technique selection module 202 uses a threshold amount of 10% or 15%.

Additionally, or alternatively, if the number of textures the instanced rendering module 208 would use exceeds the number of textures available for use by the application 104 then the rendering technique selection module 202 selects vector rendering for the level. However, if the number of textures the instanced rendering module 208 would use does not exceed the number of textures available for use by the application 104 then the rendering technique selection module 202 selects instanced rendering for the level. This avoids potential issues with the computing device 102 due to the number of textures supported by the hardware, software, or firmware being exceeded, such as the application 104 crashing or the computing device 102 shutting down.

Additionally, or alternatively, if the dimension of a texture the instanced rendering module 208 would use exceeds a maximum texture dimension for the computing device 102 (e.g., exceeds a maximum texture buffer size), then the rendering technique selection module 202 selects vector rendering for the level. However, if the dimension of no texture the instanced rendering module 208 would use exceeds the maximum texture dimension for the computing device 102, then the rendering technique selection module 202 selects instanced rendering for the level. This avoids potential issues with the computing device 102 due to the maximum texture dimension for the computing device 102 being exceeded, such as the application 104 crashing or the texture not being displayed properly.

Each of the instanced rendering module 208 and the vector rendering module 210 renders data to the offscreen buffer 212 by writing data to the offscreen buffer 212. Upon completion of rendering data for a given level, the instanced rendering module 208 or vector rendering module 210 returns a completion indication to the rendering technique selection module 202. In response to the completion indication, the rendering technique selection module 202 selects one of the instanced rendering module 208 and the vector rendering module 210 to render data for the next level and provides the rendering commands 222 to the vector rendering module 210 or the rendering commands 226 to the instanced rendering module 208 to render the next level to the offscreen buffer 212.

In one or more implementations, the switchable rendering system 106 renders data to the offscreen buffer 212 in a bottom up approach. Accordingly, in such implementations data for the lowest of the multiple hierarchical levels is rendered first to the offscreen buffer 212, followed by data for the next higher of the multiple hierarchical levels, and so forth.

As discussed above, the rendering technique selection module 202 determines for one or more of the multiple hierarchical levels to switch from using the instanced rendering module 208 to using the vector rendering module 210. In response to determining to switch from using instanced rendering to vector rendering, the rendering technique selection module 202 obtains a raster graphic 234 from the offscreen buffer 212. The raster graphic 234 is the data (e.g., a bitmap) that has been written to the offscreen buffer 212 for one or more levels so far. E.g., if the rendering technique selection module 202 determines to switch from using instanced rendering to vector rendering between the third and fourth levels, then the raster graphic 234 is a raster graphic of the data in the offscreen buffer 212 resulting from rendering the first, second, and third levels.

The rendering technique selection module 202 maintains the raster graphic 234 in the cache 206. The vector rendering module 210 obtains the raster graphic 234 from the cache 206 and uses the raster graphic 234 when generating the rendering data 224. Accordingly, when vector rendering module 210 is generating rendering data 224 that repeats data, that repeated data is the raster graphic 234.

By switching from instanced rendering to vector rendering, the resources that the switchable rendering system 106 (and thus application 104) uses to store the raster graphic 234 are reduced. For example, for a current level if the raster graphic resulting from the immediately preceding level were to be used as the base art for instanced rendering, then the resources (e.g., memory separate from the offscreen buffer) would need to be sufficient to accommodate all instances of the raster graphic in the current level. This number of instances varies based on the pattern for the given level. However, for a current level if the raster graphic resulting from the immediately preceding level were to be cached and used for vector rendering, the resources (e.g., memory separate from the offscreen buffer) need only be sufficient to accommodate a single instance of the raster graphic from the immediately preceding level, regardless of the number of instances of the raster graphic in the current level.

Figure 5A:
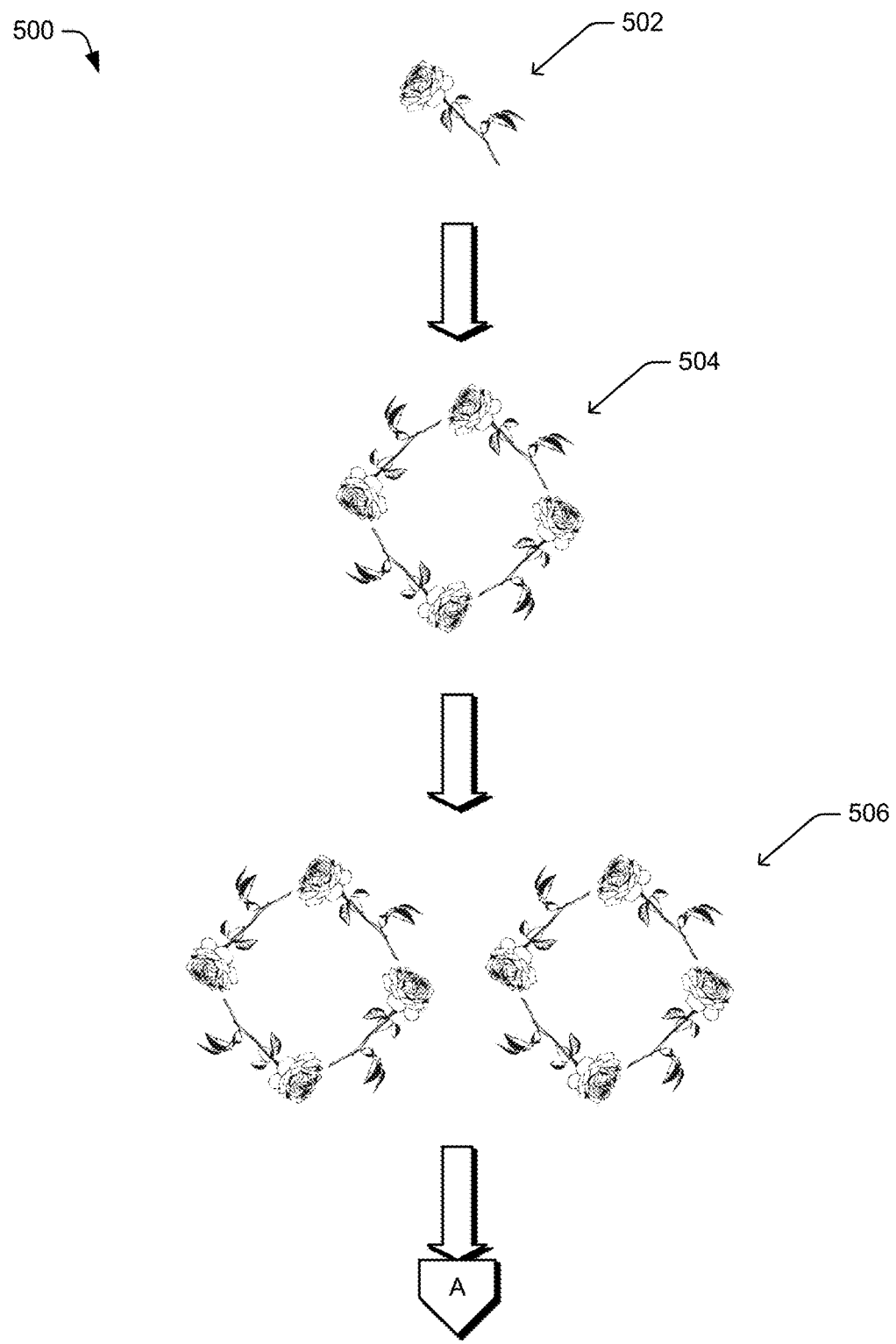
FIGS. 5A, 5B, and 5C illustrate another example of nested repetition of a base art.
Figure 5B:
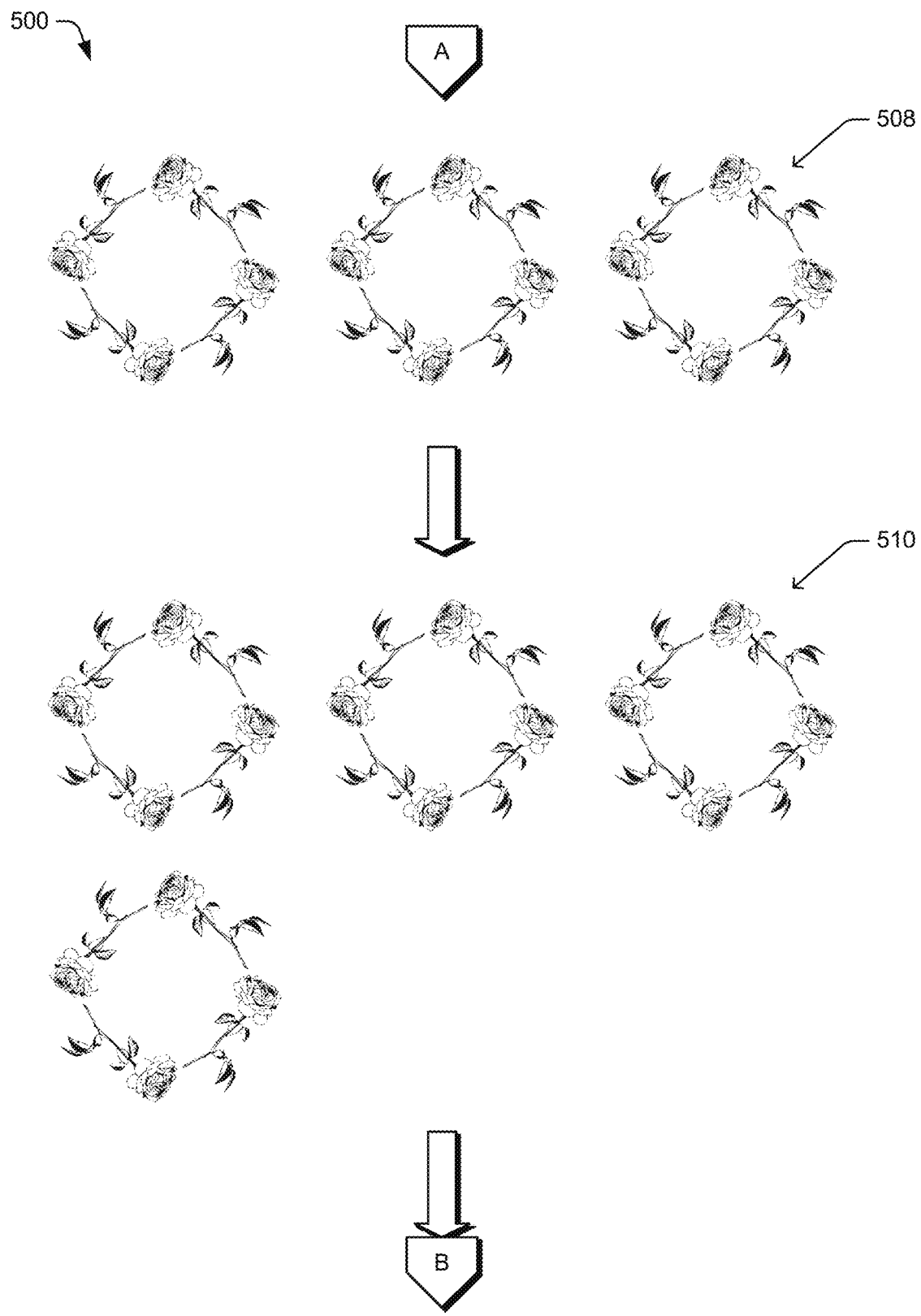
Figure 5C:
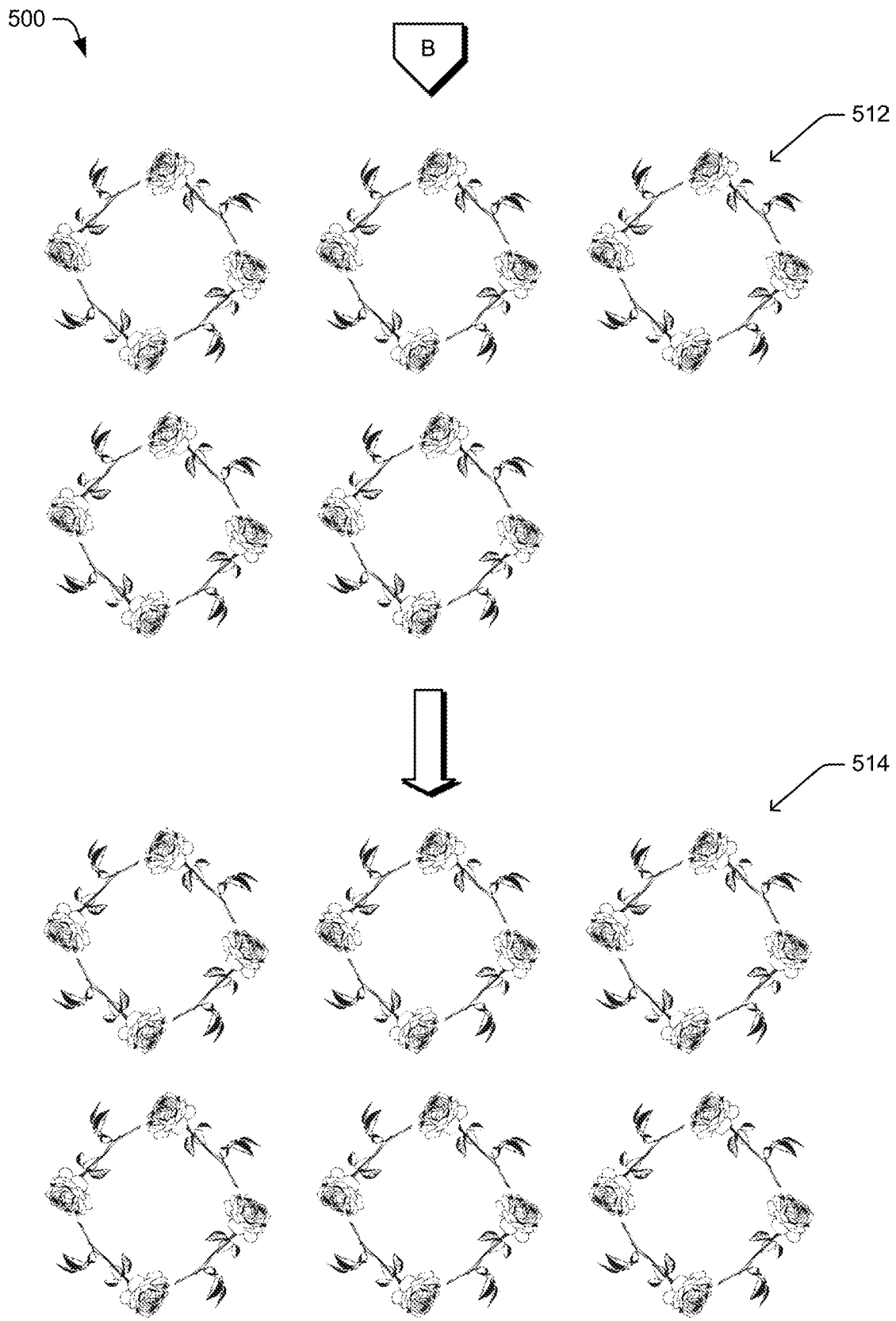

FIGS. 5A, 5B, and 5C illustrate an example 500 of nested repetition of a base art. In FIG. 5A, a base art 502 is illustrated as a rose. The base art 502 is repeated in a radial pattern with four roses in the pattern, and the radial pattern is then repeated in a 2 by 3 grid pattern (e.g., analogous to the illustration 306 of FIG. 3). Accordingly, the nested repetition includes multiple (three) hierarchical levels: a first level (e.g., the lowest or inner-most level) that is the base art 502, a second level (e.g., interior or mid level) that is the radial pattern, and a third level (e.g., the highest or top-most level) that is the 2 by 3 grid pattern.

The first level of the nested repetition is generated by rendering the base art 502 in a single step. This rendering of the base art is performed by the instanced rendering module 208, although alternatively is performed by the vector rendering module 210. The base art 502 is obtained from any of various sources as discussed above. The second level is generated in a single step by using the instanced rendering module 208 to generate the radial pattern 504 of four roses. After generating the radial pattern 504 the switchable rendering system 106 switches to vector rendering, caching the raster graphic of the radial pattern 504. The third level is generated in a series of five steps, each step being the vector rendering module 210 rendering the raster graphic of the radial pattern 504. Accordingly, a second raster graphic of the radial pattern 504 is rendered, resulting in the offscreen buffer 212 including the pattern 506. A third raster graphic of the radial pattern 504 is then rendered, resulting in the offscreen buffer 212 including the pattern 508. A fourth raster graphic of the radial pattern 504 is then rendered, resulting in the offscreen buffer 212 including the pattern

510. A fifth raster graphic of the radial pattern 504 is then rendered, resulting in the offscreen buffer 212 including the pattern 512. A sixth raster graphic of the radial pattern 504 is then rendered, resulting in the offscreen buffer 212 including the pattern 514, which is the 2 by 3 grid of radial patterned roses. Accordingly, the pattern 514, which includes 24 roses, is rendered in seven steps. In contrast, if vector rendering had been used to render all 24 roses, each rose would have been rendered in a different step, resulting in 24 steps.

Returning to FIG. 2, in one or more implementations the rendering technique selection module 202 dynamically determines, for each level, whether to use instanced rendering or vector rendering based on resource availability as discussed above. Resource availability oftentimes changes as the switchable rendering system 106 runs, so situations arise in which resource availability did not allow for instanced rendering for one level but does allow for instanced rendering for a subsequent level. The rendering technique selection module 202 is able to switch between instanced rendering and vector rendering any number of times.

Each time the rendering technique selection module 202 switches from using instanced rendering to vector rendering, the rendering technique selection module 202 obtains the raster graphic 234 from the offscreen buffer 212 and replaces any data in the cache 206 with the obtained raster graphic 234. Raster graphics 234 stored in the cache 206 for lower levels need not be maintained after a raster graphic 234 for a higher level is stored in the cache 206 because the raster graphic 234 for the higher level includes the data from the raster graphic in the lower level. For example, assume a nested repetition of five levels is being rendered with the first and second levels being rendered using instanced rendering, the third level being rendered using vector rendering, the fourth level being rendered instanced rendering, and the fifth level being rendered using vector rendering. In this example, the raster graphic from the second level is first stored in the cache 206 and then replaced by the raster graphic from the fourth level. The raster graphic from the second level need not be maintained because the raster graphic from the fourth level includes the graphic data that is in the raster graphic from the second level.

Additionally or alternatively, rather than dynamically determining at each level whether to use instanced rendering or vector rendering, the rendering technique selection module 202 optionally determines which level to switch from instanced rendering to vector rendering in response to the receipt of the commands 220. Thus, rather than making the determination at each level, the rendering technique selection module 202 determines, based on the resource availability when rendering the lowest level, when to switch from instanced rendering to vector rendering module. In such situations, the rendering technique selection module 202 assumes resource availability remains the same at each level and readily determines, based on the base art size and repetition patterns, an amount of resources used to generate each level. This determined amount of resources is compared to the resources available to determine at which level to switch from instanced rendering to vector rendering.

In the discussions above, the rendering technique selection module 202 is discussed as dynamically determining the resource availability and the amount of resources estimated to be used in rendering a level. Additionally or alternatively, the rendering technique selection module 202 statically determines whether to use instanced rendering or vector rendering based on resource availability (or based on resource usage). As an example of this static determination, the rendering technique selection module 202 determines that vector rendering is to be used in response to resource availability being less than a threshold amount (e.g., memory available to the application 104 being less than 50 megabytes). As another example of this static determination, the rendering technique selection module 202 determines that vector rendering is to be used in response to resource usage for the level being greater than a threshold amount (e.g., memory usage being greater than 500 megabytes).

Furthermore, in the discussions above the rendering technique selection module 202 is discussed as selecting instanced rendering or vector rendering for each level. In some situations both instanced rendering and vector rendering is performed for a level. In such situations, for a given level both the instanced rendering module 208 and the vector rendering module 210 render data to the offscreen buffer 212.

After all of the levels in the nested repetition are rendered to the offscreen buffer 212, the data in the offscreen buffer 212 is provided as nested repetition display data 236 to a display module 238 for display. The display module 238 displays the nested repetition display data 236 on, for example, the display device 114 of FIG. 1.

Example Procedures

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made to FIGS. 1-5C.

Figure 6:
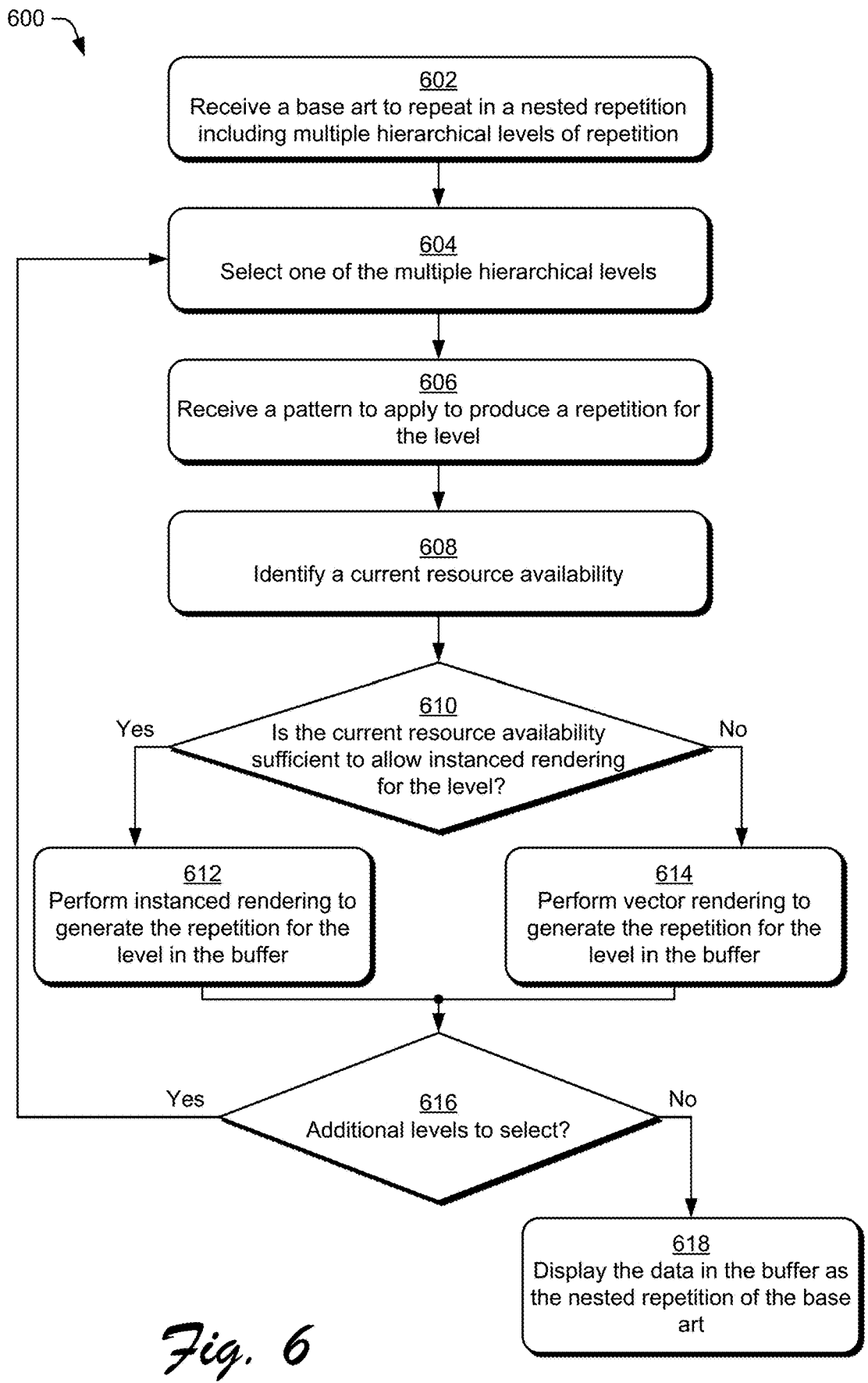
FIG. 6 is a flow diagram depicting a procedure in an example implementation of generating nested repetitions for display using multiple rendering techniques.

FIG. 6 is a flow diagram 600 depicting a procedure in an example implementation of generating nested repetitions for display using multiple rendering techniques. In this example, a base art to repeat in a nested repetition is received (block 602). The nested repetition includes multiple hierarchical levels, ranging from a lowest level (e.g., the base art) to a highest level (e.g., the final result of the nested repetition).

One of the multiple hierarchical levels is selected (block 604). In one or more implementations, the first hierarchical level selected is the lowest level. In subsequent selections, the hierarchical level one higher than the previously selected level (the hierarchical level that immediately succeeds the previously selected level) is selected.

A pattern to apply to produce a repetition for the selected level is received (block 606). Examples of the pattern, as discussed above, include a concentric pattern, a symmetric pattern along an axis, a radial pattern, a grid pattern, a path pattern, and so forth.

A current resource availability is identified (block 608). Examples of the resources, as discussed above, include memory, textures, texture dimension, and so forth.

A determination is made as to whether the current resource availability is sufficient to allow instanced rendering for the level (block 610). Examples of making this determination, as discussed above, include determining whether an estimated amount of memory generating the repetition with instanced rendering uses is within a threshold amount of an amount of memory available to an application including the rendering technique selection module, determining whether a number of textures generating the repetition with instanced rendering uses is within a threshold amount of a number of textures available to an application including the rendering technique selection module, and determining whether an estimated texture dimension generating the repetition with instanced rendering uses is less than a maximum texture dimension for the computing device.

In response to determining that the current resource availability is sufficient to allow instanced rendering for the level, instanced rendering is performed to generate the repetition for the level in a buffer (block 612). Instanced rendering is performed by generating an affine transformation matrix corresponding to the pattern and applying the transformation matrix to the base art.

In response to determining that the current resource availability is not sufficient to allow instanced rendering for the level, vector rendering is performed to generate the repetition for the level in the buffer (block 614). Vector rendering is performed by copying the base art or a raster graphic that was generated in a previous level and obtained from the buffer.

A check is made as to whether there are additional levels of the multiple hierarchical levels to select (block 616). In one or more implementations, each level of the multiple hierarchical levels is selected once.

If there are additional levels to select then one of the multiple hierarchical levels that has not yet been selected is selected (block 604). However, if there are no additional levels to select then the data in the buffer is displayed as the nested repetition of the base art (block 618).

Example System and Device

Figure 7:
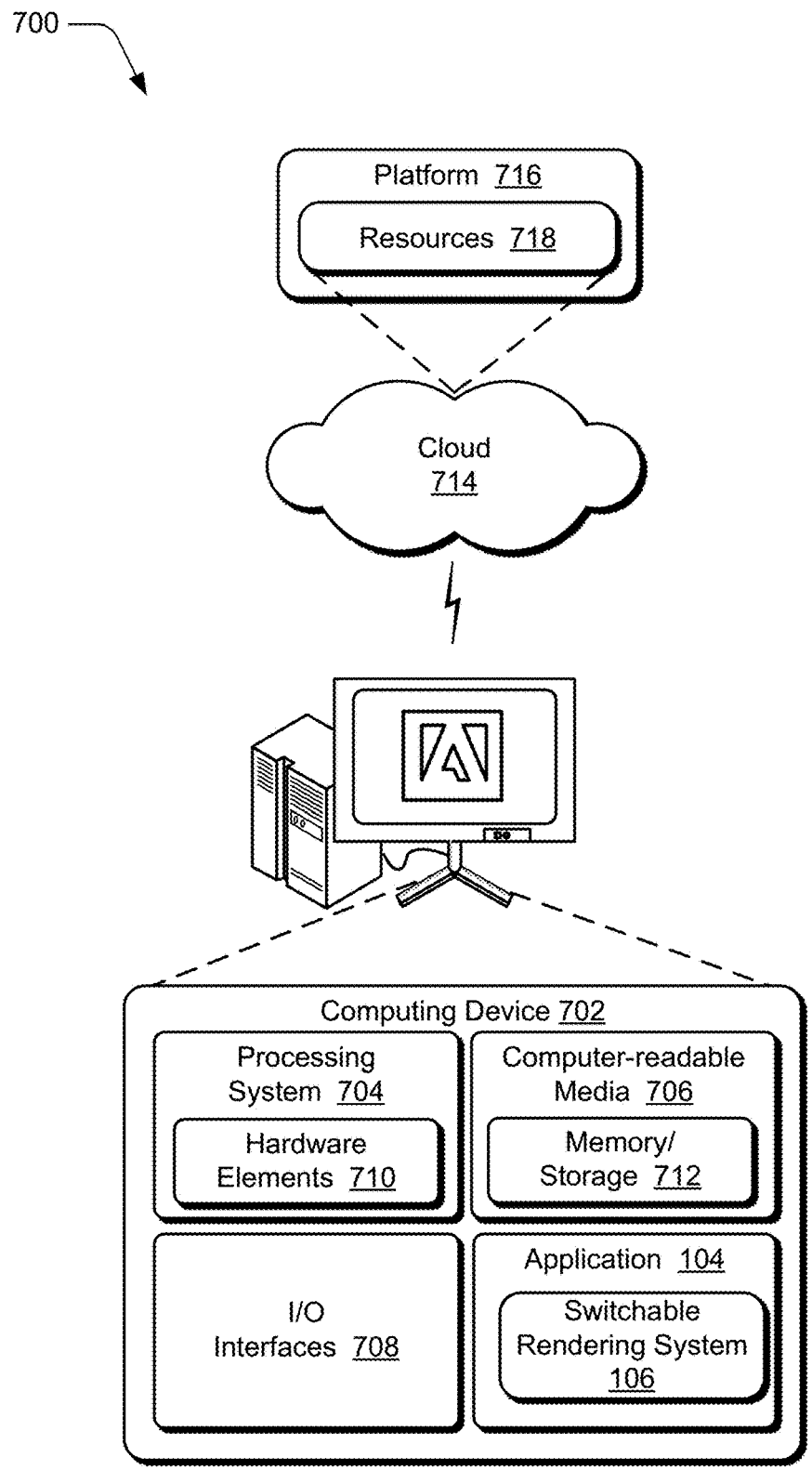
FIG. 7 illustrates an example system including various components of an example device that is implemented as any type of computing device as described and/or utilized with reference to FIGS. 1-6 to implement aspects of the techniques described herein.

FIG. 7 illustrates an example system generally at 700 that includes an example computing device 702 that is representative of one or more computing systems and/or devices that implement the various techniques described herein. This is illustrated through inclusion of the application 104 with the switchable rendering system 106. The computing device 702 is, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, in one or more implementations the computing device 702 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that are configured, for example, as processors, functional blocks, and so forth. In one or more implementations, the processing system 704 includes at least one central processing unit (CPU) and at least one graphics processing unit (GPU). A CPU and GPU share memory or have their own dedicated memories. The processing system 704 is optionally implemented in hardware as an application specific integrated circuit or other logic device formed using one or more semiconductors. The hardware elements 710 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 706 is illustrated as including memory/storage 712. The memory/storage 712 represents memory/storage capacity associated with one or more computer-readable media. The memory/storage component 712 represents memory/storage capacity associated with one or more computer-readable media. The memory/storage component 512 includes one or both of volatile media (such as random access memory (RAM)) and non-volatile media (such as read only memory (ROM), Flash memory, optical disks, magnetic disks, and so forth). The memory/storage component 712 includes one or both of fixed media (e.g., RAM, ROM, a fixed hard drive, and so on) and removable media (e.g., Flash memory, a removable hard drive, an optical disc, and so forth). The computer-readable media 706 is optionally configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

An implementation of the described modules and techniques is optionally stored on or transmitted across some form of computer-readable media. The computer-readable media includes any of a variety of media that is accessible by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some implementations to implement at least some aspects of the techniques described herein, such as to perform one or more instructions. Hardware includes, for example, components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achievable at least partially in hardware, e.g., through use of computer-readable storage media and/or hardware elements 710 of the processing system 704. The instructions and/or functions executable/operable by one or more articles of manufacture (for example, one or more computing devices 702 and/or processing systems 704) to implement techniques, modules, and examples described herein.

The techniques described herein are supported by various configurations of the computing device 702 and are not limited to the specific examples of the techniques described herein. Additionally or alternatively, this functionality is implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data utilizable while computer processing is executed on servers that are remote from the computing device 702. Resources 718 optionally include services provided over the Internet and/or through a subscriber network, such as a cellular or Wi-Fi network.

The platform 716 abstract resources and functions to connect the computing device 702 with other computing devices. The platform 716 also optionally serves to abstract scaling of resources to provide a corresponding level of scale to encountered demand for the resources 718 that are implemented via the platform 716. Accordingly, in an interconnected device embodiment, implementation of functionality described herein is distributed throughout the system 700. For example, the functionality is implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
  receiving, by a rendering technique selection module, a base art to repeat in a nested repetition including multiple hierarchical levels of repetitions;
  for each of the multiple hierarchical levels:
    receiving, by the rendering technique selection module, a pattern to apply to produce a repetition for the level;
    identifying, by a resource monitoring module, a current resource availability in the at least one computing device;
    determining, by the rendering technique selection module, whether the current resource availability is sufficient to allow instanced rendering for the level;
    performing, by an instanced rendering module in response to determining that the current resource availability is sufficient to allow instanced rendering for the level, instanced rendering to generate the repetition for the level in a buffer by generating an affine transformation matrix corresponding to the pattern and applying the transformation matrix to the base art;
    performing, by a vector rendering module in response to determining that the current resource availability is not sufficient to allow instanced rendering for the level, vector rendering to generate the repetition for the level in the buffer by copying the base art;
  displaying, by a display module, data in the buffer as the nested repetition of the base art.

2. The method as recited in claim 1, the resource including memory and the determining including determining whether an estimated amount of memory generating the repetition with instanced rendering uses is within a threshold amount of an amount of memory available to an application including the rendering technique selection module.

3. The method as recited in claim 1, the resource including textures and the determining including determining whether a number of textures generating the repetition with instanced rendering uses is within a threshold amount of a number of textures available to an application including the rendering technique selection module.

4. The method as recited in claim 1, the resource includes a texture dimension and the determining comprises determining whether an estimated texture dimension generating the repetition with instanced rendering uses is less than a maximum texture dimension for the computing device.

5. The method as recited in claim 1, further comprising for a first level of the multiple hierarchical levels:
   determining that the current resource availability is not sufficient to allow instanced rendering for the first level;
   storing in a cache, in response to determining that the current resource availability is not sufficient to allow instanced rendering for the first level, a raster graphic of the repetition rendered in the buffer in a second level of the multiple hierarchical levels that immediately precedes the first level;
   performing, in the first level, vector rendering to generate the repetition for the first level in the buffer by copying the cached raster graphic.

6. The method as recited in claim 5, further comprising for a third level of the multiple hierarchical levels that succeeds the second level of the multiple hierarchical levels:
   determining that the current resource availability is sufficient to allow instanced rendering for the third level;
   performing instanced rendering to generate the repetition for the third level in the buffer by generating an additional affine transformation matrix corresponding to the pattern and applying the additional affine transformation matrix to the cached raster graphic.

7. The method as recited in claim 6, further comprising for a fourth level of the multiple hierarchical levels that succeeds the third level of the multiple hierarchical levels:
   determining that the current resource availability is not sufficient to allow instanced rendering for the fourth level;
   replacing, in response to determining that the current resource availability is not sufficient to allow instanced rendering for the fourth level, the raster graphic in the cache with an additional raster graphic of the repetition rendered in the buffer in the third level;
   performing, in the fourth level, vector rendering to generate the repetition for the fourth level in the buffer by copying the cached additional raster graphic.

8. The method as recited in claim 1, the nested repetition including one or more of a group including: repetition in a concentric pattern, repetition in a symmetric pattern along an axis, repetition in a radial pattern, repetition in a grid pattern, and repetition in a path pattern.

9. In a digital medium environment, a computing device comprising:
   at least one processor; and
   computer-readable storage media having stored thereon multiple instructions of an application that, responsive to execution by the processor, cause the at least one processor to:
      receive a base art to repeat in a nested repetition including multiple hierarchical levels of repetitions;
      for each of the multiple hierarchical levels:
         receive a pattern to apply to produce a repetition for the level;
         identify a current resource availability in the computing device;
         determine whether the current resource availability is sufficient to allow instanced rendering for the level;
         perform, in response to determining that the current resource availability is sufficient to allow instanced rendering for the level, instanced rendering to generate the repetition for the level in an offscreen buffer by applying to the base art a transformation matrix corresponding to the pattern;
         perform, in response to determining that the current resource availability is not sufficient to allow instanced rendering for the level, vector rendering to generate the repetition for the level in the offscreen buffer by copying the base art;
      display data in the offscreen buffer as the nested repetition of the base art.

10. The computing device as recited in claim 9, the resource including memory and wherein to determine whether the current resource availability is sufficient is to determine whether an estimated amount of memory generating the repetition with instanced rendering uses is within a threshold amount of an amount of memory available to the application.

11. The computing device as recited in claim 9, the resource including textures and wherein to determine whether the current resource availability is sufficient is to determine whether a number of textures generating the repetition with instanced rendering uses is within a threshold amount of a number of textures available to the application.

12. The computing device as recited in claim 9, the resource includes a texture dimension and wherein to determine whether the current resource availability is sufficient is to determine whether an estimated texture dimension generating the repetition with instanced rendering uses is less than a maximum texture dimension for the computing device.

13. The computing device as recited in claim 9, wherein the multiple instructions further cause the at least one processor to, for a first level of the multiple hierarchical levels:
   determine that the current resource availability is not sufficient to allow instanced rendering for the first level;
   store in a cache, in response to determining that the current resource availability is not sufficient to allow instanced rendering for the first level, a raster graphic of the repetition rendered in the buffer in a second level of the multiple hierarchical levels that immediately precedes the first level;
   perform, in the first level, vector rendering to generate the repetition for the first level in the buffer by copying the cached raster graphic.

14. The computing device as recited in claim 13, wherein the multiple instructions further cause the at least one processor to, for a third level of the multiple hierarchical levels that succeeds the second level of the multiple hierarchical levels:
   determine that the current resource availability is sufficient to allow instanced rendering for the third level;
   perform instanced rendering to generate the repetition for the third level in the buffer by generating an additional affine transformation matrix corresponding to the pattern and applying the additional affine transformation matrix to the cached raster graphic.

15. The computing device as recited in claim 14, wherein the multiple instructions further cause the at least one processor to, for a fourth level of the multiple hierarchical levels that succeeds the third level of the multiple hierarchical levels:
- determine that the current resource availability is not sufficient to allow instanced rendering for the fourth level;
- replace, in response to determining that the current resource availability is not sufficient to allow instanced rendering for the fourth level, the raster graphic in the cache with an additional raster graphic of the repetition rendered in the buffer in the third level;
- perform, in the fourth level, vector rendering to generate the repetition for the first level in the buffer by copying the cached additional raster graphic.

16. The computing device as recited in claim 9, the nested repetition including one or more of a group including: repetition in a concentric pattern, repetition in a symmetric pattern along an axis, repetition in a radial pattern, repetition in a grid pattern, and repetition in a path pattern.

17. A system comprising:
- a processing device;
- a memory component coupled to the processing device;
- a rendering technique selection module to receive a base art to repeat in a nested repetition including multiple hierarchical levels of repetitions;
- means for performing, for each of the multiple hierarchical levels, instanced rendering for the level in response to detecting that current resource availability is sufficient to allow instanced rendering, the instanced rendering generating the repetition for the level in a buffer by generating an affine transformation matrix corresponding to a pattern and applying the transformation matrix to the base art;
- means for performing, for each of the multiple hierarchical levels, vector rendering for the level in response to detecting that the current resource availability is insufficient to allow instanced rendering, the vector rendering generating the repetition for the level in the buffer by copying the base art; and
- a display module, to display data generated for the repetitions in the multiple hierarchical levels.

18. The system as recited in claim 17, the means for selecting including means for determining whether an estimated amount of memory generating the repetition with instanced rendering uses is within a threshold amount of an amount of memory available to an application including the rendering technique selection module.

19. The system as recited in claim 17, the means for selecting including means for determining whether a number of textures generating the repetition with instanced rendering uses is within a threshold amount of a number of textures available to an application including the rendering technique selection module.

20. The system as recited in claim 17, the means for selecting including means for determining whether an estimated texture dimension generating the repetition with instanced rendering uses is less than a maximum texture dimension for a computing device including the system.

* * * * *